United States Patent
Asao et al.

(10) Patent No.: US 10,696,320 B2
(45) Date of Patent: Jun. 30, 2020

(54) ELECTRICAL POWER STEERING APPARATUS HOUSING WITH REDUCED PRESSURE FOR POWER BOARD CONNECTORS

(71) Applicant: Mitsubishi Electric Corporation, Tokyo (JP)

(72) Inventors: Yoshihito Asao, Tokyo (JP); Akihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 388 days.

(21) Appl. No.: 15/564,235

(22) PCT Filed: Jul. 31, 2015

(86) PCT No.: PCT/JP2015/071771
§ 371 (c)(1),
(2) Date: Oct. 4, 2017

(87) PCT Pub. No.: WO2016/163037
PCT Pub. Date: Oct. 13, 2016

(65) Prior Publication Data
US 2018/0127020 A1    May 10, 2018

(30) Foreign Application Priority Data
Apr. 10, 2015    (JP) .................................. 2015-080600

(51) Int. Cl.
*B62D 5/04*    (2006.01)
*H02K 11/33*    (2016.01)
(Continued)

(52) U.S. Cl.
CPC ............ *B62D 5/0406* (2013.01); *B62D 5/046* (2013.01); *H02K 5/22* (2013.01); *H02K 5/225* (2013.01);
(Continued)

(58) Field of Classification Search
CPC ........ B62D 5/0406; B62D 5/046; H02K 11/30; H02K 11/33; H02K 5/22; H02K 5/225; H02K 11/00
See application file for complete search history.

(56) References Cited

U.S. PATENT DOCUMENTS 5,126,608 A * 6/1992 Sogabe .................. H02K 5/225
310/71
7,713,086 B2 * 5/2010 Schmitz ............... H01R 12/585
439/567

(Continued)

FOREIGN PATENT DOCUMENTS

EP    2 371 673 A2    10/2011
JP    2004-048904 A    2/2004
(Continued)

OTHER PUBLICATIONS

Extended European Search Report dated Oct. 9, 2018 issued by the European Patent Office in counterpart application No. 15888528.5.
(Continued)

*Primary Examiner* — Emily P Pham
(74) *Attorney, Agent, or Firm* — Sughrue Mion, PLLC; Richard C. Turner

(57) ABSTRACT

In the electric power steering apparatus according to the present invention, a circuit board and an intermediate member are disposed so as to be juxtaposed in an axial direction of a rotating shaft, a connector is formed integrally on the intermediate member, and is disposed so as to pass through and protrude from a notch in a housing, and at least one of a cylindrical portion of a motor case, a frame, and the housing is configured so as to bear stress in the axial direction of the rotating shaft, that acts on the connector during insertion and removal of the connector.

10 Claims, 4 Drawing Sheets

(51) Int. Cl.
*H02K 11/00* (2016.01)
*H02K 5/22* (2006.01)
*H02K 11/30* (2016.01)

(52) U.S. Cl.
CPC ............ *H02K 11/00* (2013.01); *H02K 11/30* (2016.01); *H02K 11/33* (2016.01)

(56) References Cited

U.S. PATENT DOCUMENTS

| | | | |
|---|---|---|---|
| 9,676,408 B2 * | 6/2017 | Tominaga | ............ B62D 5/0406 |
| 2012/0229005 A1 | 9/2012 | Tominaga et al. | |
| 2014/0300304 A1 * | 10/2014 | Omae | .................. H02K 11/024 318/400.24 |
| 2015/0372559 A1 * | 12/2015 | Hattori et al. | .......... F04B 35/04 310/71 |
| 2017/0305457 A1 * | 10/2017 | Koike | ...................... H02K 5/22 |

FOREIGN PATENT DOCUMENTS

| | | |
|---|---|---|
| JP | 2006-280089 A | 10/2006 |
| JP | 2007-185055 A | 7/2007 |
| JP | 2011-200022 A | 10/2011 |
| JP | 5316469 B2 | 10/2013 |
| WO | 2014/054098 A1 | 4/2014 |

OTHER PUBLICATIONS

International Search Report for PCT/JP2015/071771 dated Nov. 2, 2015 [PCT/ISA/210].
Written Opinion for PCT/JP2015/071771 dated Nov. 2, 2015 [PCT/ISA/237].
Communication dated Dec. 4, 2018 issued by the China National Intellectual Property Administration in counterpart application No. 201580078512.2.

* cited by examiner

ELECTRICAL POWER STEERING APPARATUS HOUSING WITH REDUCED PRESSURE FOR POWER BOARD CONNECTORS

CROSS REFERENCE TO RELATED APPLICATIONS

This application is a National Stage of International Application No. PCT/JP2015/071771 filed Jul. 31, 2015, claiming priority based on Japanese Patent Application No. 2015-080600 filed Apr. 10, 2015, the contents of all of which are incorporated herein by reference in their entirety.

TECHNICAL FIELD

The present invention relates to an automotive electric power steering apparatus, and particularly relates to an apparatus in which a motor and a control unit are juxtaposed in an axial direction of a rotating shaft of the motor and integrated.

BACKGROUND ART

Electric power steering apparatuses generally include a plurality of connectors for a large number of sensors and an electric power supply system. There may be a plurality of types such as an electric power supply connector, and signal connectors, for example, depending on the magnitude of the electric current that flows therethrough. In apparatuses in which a motor and a control unit are integrated, in particular, the control unit is configured by disposing and integrating a large number of parts such as connectors, a circuit board, a motor driving circuit, and a housing, and when consideration is given to mountability to a vehicle, reductions in size and weight of the control unit are in demand.

In an electric driving apparatus that is disclosed in Patent Literature 1, a control unit is disposed at an opposite end of a motor from an output end of a rotating shaft, and is integrated with the motor, and the control unit is configured such that switching elements that constitute part of an inverter circuit are mounted to a first surface side of the heatsink, an intermediate member and a circuit board are disposed sequentially so as to be juxtaposed on the first surface side of the heatsink, a case is mounted to the first surface side of the heatsink so as to envelop the switching elements, the intermediate member, and the circuit board, and a plurality of connectors are mounted to the case.

A driving apparatus that is disclosed in Patent Literature 2 is configured by disposing a circuit board, power modules, a heatsink, and a cover sequentially at an opposite end of a motor from a rotating shaft, and connectors are mounted to the circuit board or the power modules.

CITATION LIST

Patent Literature

Patent Literature 1: International Publication No. WO/2014/054098
Patent Literature 2: Japanese Patent No. 5316469 (Gazette)

SUMMARY OF THE INVENTION

Problem to be Solved by the Invention

In the electric driving apparatus that is disclosed in Patent Literature 1, in addition to the circuit board, the intermediate member, and the switching elements that constitute part of the inverter circuit, a large number of members that connect the connectors, the circuit board, the intermediate member, and the switching elements electrically and mechanically are also disposed inside the case. Electrical wiring, in particular, requires connecting terminals that are greater than or equal in number to the number of pins that are used in the connectors, and also requires a large number of steps in work flow to assemble all these.

In the driving apparatus that is disclosed in Patent Literature 2, on the other hand, the connectors are mounted to the circuit board or the power modules by connecting terminals that extend from main bodies thereof to the wiring of the circuit board or the power modules by welding or soldering, improving workability in comparison with the electric driving apparatus that is disclosed in Patent Literature 1 with respect to the connections between the connectors and the circuit board or the power modules. However, when consideration is given to the connectors being inserted and removed, because stresses that arise at that time are applied directly to the circuit board or the power modules, electrical connection failure between the connectors and the circuit board or the power modules and electrical connection failure inside in the circuit board or the power modules have been more likely to occur.

The present invention aims to solve the above problems and the present invention provides an electric power steering apparatus that enables reductions in size, reductions in weight, and improvements in mountability, and also enables the occurrence of electrical connection failure in the circuit board that results from inserting and removing connectors to be suppressed by simplifying construction and parts of a control unit.

Means for Solving the Problem

In an electric power steering apparatus according to the present invention, a motor and a control unit are integrated so as to be juxtaposed in an axial direction of a rotating shaft of the motor. The motor includes: a motor case that includes: a cylindrical portion; and a floor portion that closes an opening at a first end of the cylindrical portion; a motor main body that is housed inside the motor case; and a frame that closes an opening at a second end of the motor case, and the control unit includes: a circuit board on which circuits for controlling driving of the motor are configured; a connector; an intermediate member that holds busbars for electrical wiring; and a housing that houses the circuit board and the intermediate member internally. The circuit board and the intermediate member are disposed so as to be juxtaposed in the axial direction of the rotating shaft, the connector is formed integrally on the intermediate member, and is disposed so as to pass through and protrude from a notch in the housing, and at least one of the cylindrical portion, the frame, and the housing is configured so as to bear stress in the axial direction of the rotating shaft, that acts on the connector during insertion and removal of the connector.

Effects of the Invention

According to the present invention, because the control unit is configured using three primary parts, namely, the housing, the circuit board, and the intermediate member with which the connectors are integrated, reductions in size, reductions in weight, and improvements in workability can be achieved.

Because stresses in the axial direction of the rotating shaft due to insertion and removal of connectors is borne by at least one of the motor case, the frame, or the housing, and do not act on the circuit board, the occurrence of electrical connection failure within the circuit board can be suppressed.

DESCRIPTION OF EMBODIMENTS

Embodiment 1

Figure 1:
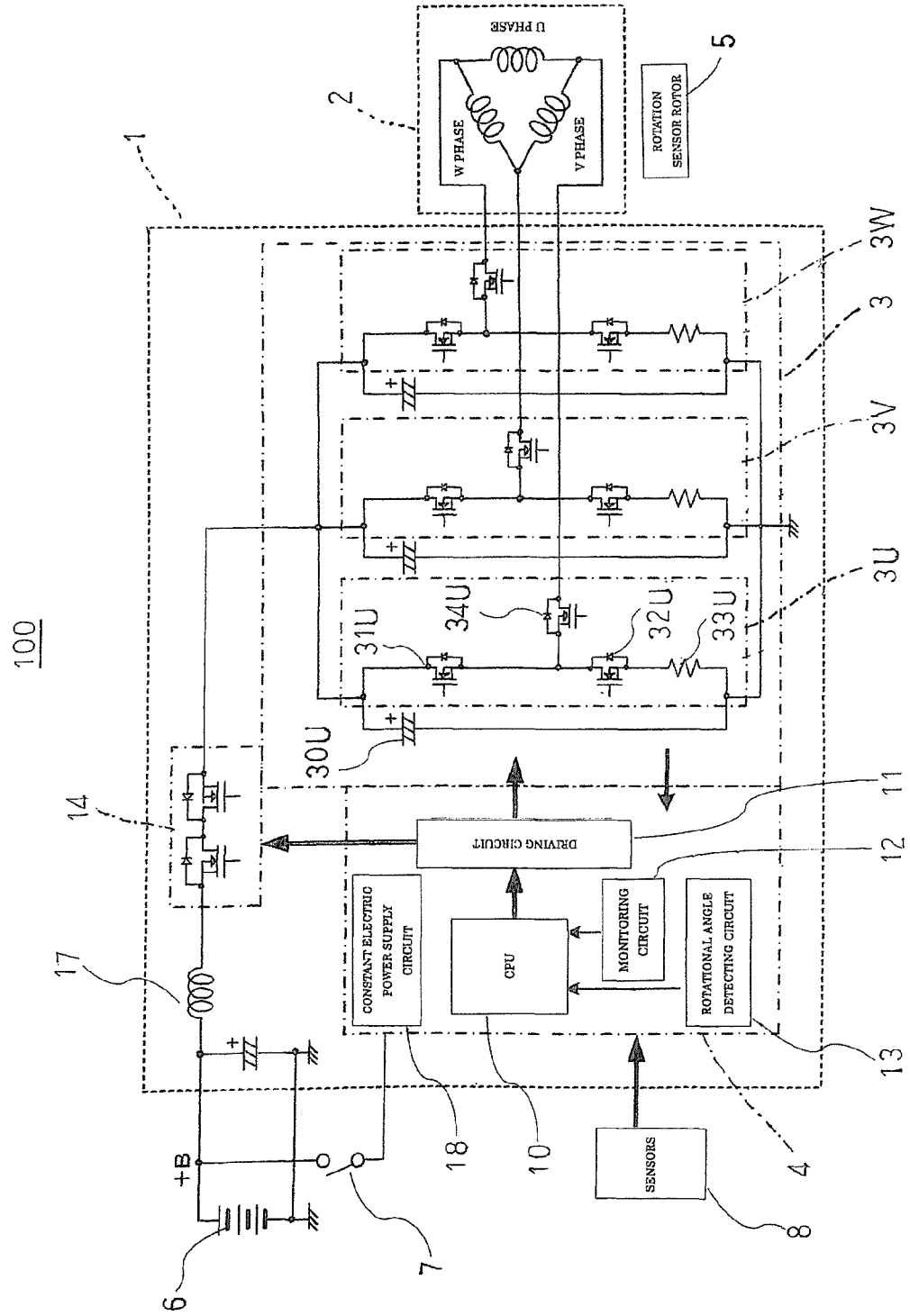
FIG. 1 is a circuit diagram for an electric power steering apparatus according to Embodiment 1 of the present invention.

FIG. 1 is a circuit diagram for an electric power steering apparatus according to Embodiment 1 of the present invention.

In FIG. 1, an electric power steering apparatus 100 includes a control unit 1 and a motor 2, the control unit 1 being configured so as to be disposed on a first axial end of a rotating shaft 21 of the motor 2 so as to be integrated with the motor 2. The electric power steering apparatus 100 is disposed such that an axial direction of the rotating shaft 21 of the motor 2 is oriented vertically and such that the control unit 1 is positioned above. In this case, the motor 2 will be explained as a three-phase brushless motor, but the motor may have brushes, or may be a polyphase winding motor that has three or more phases. The control unit 1 is mainly configured around a circuit board 4 to which are mounted: a central processing unit (CPU) 10, various kinds of circuits, and an inverter circuit 3 that supplies electric current to the motor 2, and the control unit 1 is disposed at an opposite end of the motor 2 from an output end of the rotating shaft 21, and is integrated with the motor 2. A rotation sensor rotor 5 that detects a rotational angle of the motor 2 is disposed in a vicinity of the rotating shaft 21 of the motor 2. Electric power is supplied by means of a battery 6 and an ignition switch 7 that are mounted to a vehicle, and various types of information from sensors 8 are also inputted into the integrated electric power steering apparatus 100.

Next, a circuit configuration for the control unit 1 will be explained in detail.

The circuit board 4 includes: the CPU 10, which computes controlling variables that supply electric power to the motor 2 based on information from the sensors 8, such as a vehicle speed sensor, a torque sensor that detects steering torque on a steering wheel, etc.; a driving circuit 11 that drives the inverter circuit 3; a monitoring circuit 12 that detects the voltage or the electric current in each portion inside the inverter circuit 3; a rotational angle detecting circuit 13 that detects the rotational angle of the motor 2 based on the information from the rotation sensor rotor 5; and a constant power supply circuit 18. A capacitor and a coil 17 are included in an electric power supply system (+B, ground) for noise suppression. Electric power supplying switching elements 14 that have a relay function that opens and closes a +B electric power supply line are also inserted into the +B electric power supply line. These switching elements are field-effect transistors (FETs), for example, and two parasitic diodes, one in a forward direction and one in a reverse direction relative to the electric current supply, are disposed in series. These switching elements 14 can forcibly shut off the electric power supply if a failure arises in the inverter circuit 3 or the motor 2, for example. In addition, if the battery is connected in reverse, the parasitic diodes can shut off the line through which the electric current flows, thereby also serving a role of battery reverse connection protection.

The inverter circuit 3 includes three circuit portions 3U, 3V, 3W that correspond to respective phases of a three-phase (U, V, and W) winding that constitutes a motor winding. Because the three circuit portions 3U, 3V, 3W have identical configurations, only one circuit portion 3U will be explained here. The circuit portion 3U includes: an upper arm switching element 31U; a lower arm switching element 32U; and a relay switching element 34U that has a relay function that opens and closes a connecting point between the upper and lower arm switching elements 31U and 32U and a U-phase winding. Because the upper and lower arm switching elements 31U and 32U are driven using pulse-width modulation (PWM) based on commands from the CPU 10, a capacitor 30U is connected in parallel to the upper and lower arm switching elements 31U and 32U for purposes of noise suppression. A shunt resistor 33U is also connected in series with the upper and lower arm switching elements 31U and 32U in order to detect the electric current that flows to the motor 2. Respective parts that constitute the circuit portion 3U, except for the capacitor 30U, are mounted to two surfaces of the circuit board 4. Hereinafter, to facilitate explanation, numbering that is applied to the capacitors, the upper arm switching elements, the lower arm switching elements, and the relay switching elements in the circuit portions 3U, 3V, and 3W will be 30, 31, 32, and 34.

Overall functioning is such that the CPU 10 computes the electric current that is supplied to the winding of the motor based on the inputted information from the sensors 8, and drives the inverter circuit 3 by means of the driving circuit 11 based on those computational results. The switching elements 31, 32, and 34 that correspond to each of the phases are thereby driven, and the electric current is supplied to the motor winding. The value of that supplied electric current is detected by the monitoring circuit 12, and the CPU 10 performs feedback control over driving of the inverter circuit 3 in response to deviation between the computed value (a target value) and the actual current value. In addition, the CPU 10 also controls driving of the electric power supplying switching elements 14 by means the driving circuit 11, and also calculates the rotational position or the speed of the motor 2 based on the inputted information from the rotational angle detecting circuit 13 and uses that calculated value in control.

Figure 2:
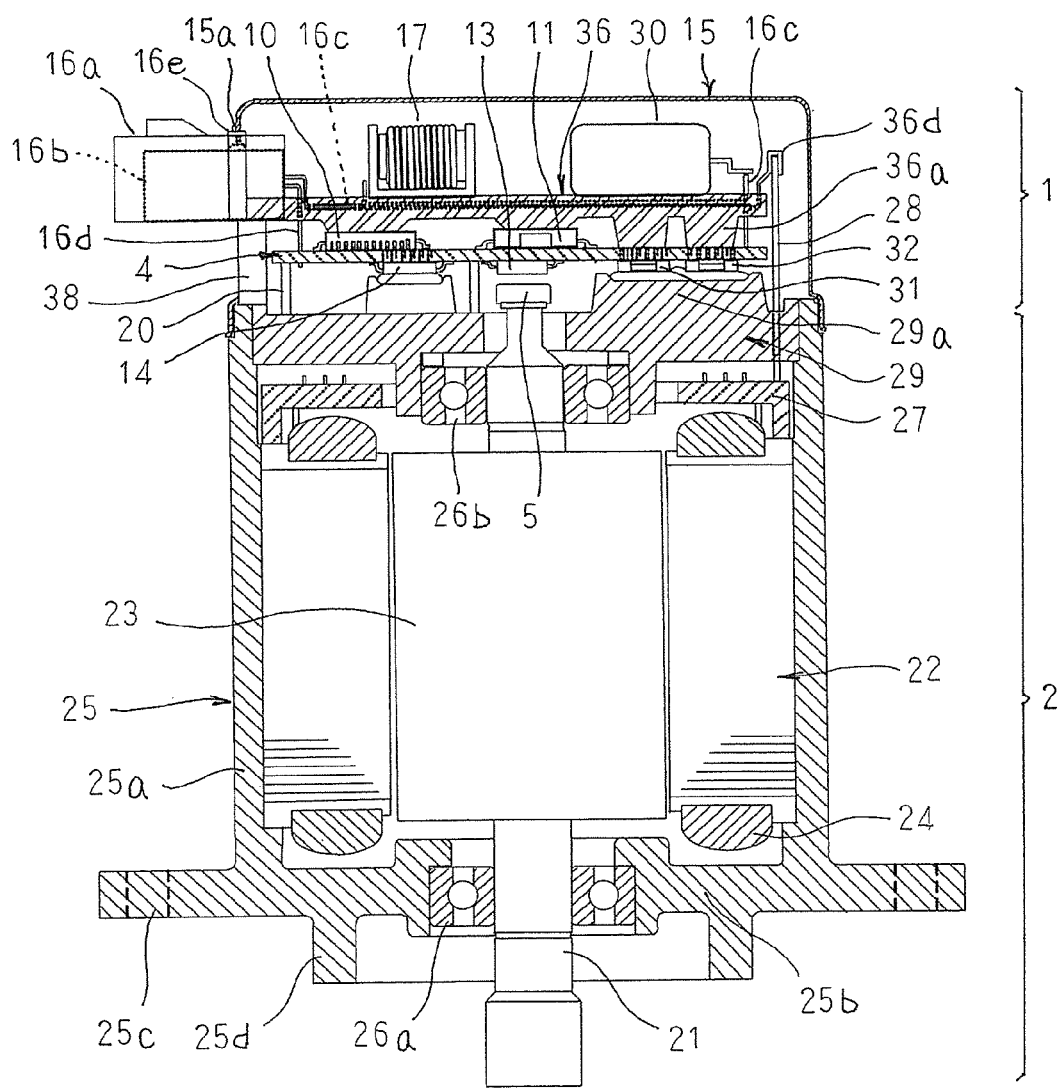
FIG. 2 is a cross section that shows the electric power steering apparatus according to Embodiment 1 of the present invention.

Next, construction of respective portions of the electric power steering apparatus 100 that is configured by integrating the control unit 1 that has circuits of this kind and the motor 2 will be explained based on FIG. 2. FIG. 2 is a cross section that shows the electric power steering apparatus according to Embodiment 1 of the present invention. In FIG. 2, the electric power steering apparatus 100 is disposed such that the axial direction of the rotating shaft 21 is vertical, the control unit 1 being above and the motor 2 below. Furthermore, output from the motor 2 is outputted to a reduction gear (not shown), for example, from a lower end portion of the rotating shaft 21.

First, the construction of the motor 2 will be explained. The motor 2 has a construction in which a motor main body is mounted internally into a floored cylindrical motor case 25 that includes a cylindrical portion 25a and a floor portion 25b. This motor case 25 is made of a metal, and when consideration is given to heat radiating characteristics and external shape, it is desirable for the motor case 25 to be made of aluminum, for example. A penetrating aperture that allows passage of the rotating shaft 21 is formed centrally on the floor portion 25b of the motor case 25, and a first bearing 26a is mounted into that penetrating aperture. A mounting flange 25c is also formed integrally so as to protrude radially outward from the floor portion 25b of the motor case 25. A connecting portion 25d that connects with the reduction gear (not shown) is further formed integrally so as to protrude downward from the floor portion 25b of the motor case 25.

The motor main body includes: a rotor 23 that is fixed to the rotating shaft 21, which is inserted centrally, and on an outer circumferential surface of which a plurality of pole pairs of permanent magnets are disposed; and a stator 22 that is disposed circumferentially outside this rotor 23 coaxially so as to have a gap interposed, the stator 22 having a motor winding 24. An annular connecting ring 27 is produced by insert-molding electrical wiring busbars into an insulating resin, and is disposed on an upper portion of the stator 22 so as to be in close proximity to the motor winding 24. Winding ends of a plurality of windings that constitute the motor winding 24 are connected to the busbars of the connecting ring 27 to form a three-phase winding that is delta-connected, as shown in FIG. 1. Output wires 28 for each of the phases that protrude from the connecting ring 27 extend toward the control unit 1.

A disk-shaped metal frame 29 is mounted to an uppermost portion of the cylindrical portion 25a of the motor case 25 in a state of internal contact. A second bearing 26b is mounted to a central portion of the frame 29. A penetrating aperture that allows passage of the rotating shaft 21 is also formed centrally on the central portion of the frame 29. In addition, penetrating apertures that allow passage of the output wires 28 for each of the phases are formed on the frame 29 at three positions. In this manner, the frame 29 serves a plurality of roles such as providing a partitioning wall that separates the motor 2 and the control unit 1, a holding portion for the second bearing 26b, a penetrating passage portion for the output wires 28, etc. In addition, the frame 29 also serves a role as a heatsink for radiating heat from the control unit 1. Because the frame 29 serves a large number of functions in this manner, the number of parts can be reduced.

The stator 22 is held in an internally fitted state inside the cylindrical portion 25a of the motor case 25 by press-fitting or shrink-fitting, etc. The rotor 23 is rotatably disposed circumferentially inside the stator 22 by the rotating shaft 21 being supported by the first bearing 26a and the second bearing 26b. The rotation sensor rotor 5 is mounted to an end of the rotating shaft 21 that protrudes from the frame 29, i.e., to a tip of the rotating shaft 21 at an opposite side end from the output end.

In this manner, the motor 2 has a construction in which the motor main body is housed inside the motor case 25, and an opening of the motor case 25 is covered by the frame 29. Thus, the electric power steering apparatus 100 is configured such that the control unit 1 and the motor 2 are assembled separately, and then the two are integrated.

Next, construction of the control unit 1 will be explained. The control unit 1 is configured by stacking the circuit board 4 and the intermediate member 36 vertically within a region that is surrounded by the frame 29 and the housing 15. The housing 15 is produced so as to have a floored cylindrical shape using a ferrous metal, for example, and is fixed in an externally fitted state by press-fitting or shrink-fitting, etc., in a vicinity of an opening over the uppermost portion of the cylindrical portion 25a of the motor case 25. Thus, a fixing member such as a screw for fixing the housing 15 to the motor case 25 is no longer required.

The CPU 10, the driving circuit 11, the rotational angle detecting circuit 13, the electric power supplying switching elements 14, the switching elements 31 and 32 that constitute part of the inverter circuit 3, etc., which are shown in the circuit diagram in FIG. 1, are disposed so as to be distributed on two surfaces of the circuit board 4. The circuit board 4 is disposed on an upper portion of the frame 29 by fixing to the frame 29 a plurality of leg portions 20 that are disposed so as to stand on a lower surface of the circuit board 4. A heat radiating portion 29a is formed on the frame 29 by making a portion thereof protrude upward. The switching elements 14, 31, and 32 that are disposed on the lower surface of the circuit board 4 contact the heat radiating portion 29a to enable generated heat to be radiated. Moreover, it is not necessary for the switching elements 14, 31, and 32 and the heat radiating portion 29a to contact directly, and they may contact through heat-transferring sheets, for example.

Connectors 16a and 16b are molded together with the intermediate member 36 using a highly heat-radiating electrically insulating resin such as a resin containing a highly thermally conductive filler (silicon, alumina, magnesium), for example. The intermediate member 36 is formed so as to have an approximate disk shape except for the perimeters of the connectors 16a and 16b. Busbars 16c and 16d are insert-molded into the intermediate member 36.

The connector 16a is for electric power supply. There are two busbars 16c, namely +B and ground. First ends of the busbars 16c protrude inside the connector 16a to form connector pins, are led around through the intermediate member 36, as indicated by broken lines in FIG. 2, and portions thereof are exposed to form a +B terminal and a ground terminal. Although not shown, electrical wiring busbars that connect the mounted elements together are insert-molded into the intermediate member 36. The coil 17 is mounted onto an upper surface of the intermediate member 36, and is connected to the +B terminal, and to the electric power supplying switching elements 14 by means of busbars that are not shown. The capacitors 30 are mounted onto the upper surface of the intermediate member 36, and are connected to the electric power supplying switching elements 14 by means of busbars that are not shown, and to the ground terminal.

The connector 16b is for sensors. First ends of busbars 16d protrude inside the connector 16b to form connector pins, and second ends protrude downward from the intermediate member 36 to be connected to wiring patterns of the circuit board 4 that are intended for connection therewith.

The intermediate member 36 is disposed above the circuit board 4 such that the connectors 16a and 16b protrude through a notch 15a in the housing 15 in a direction that is perpendicular to a vertical direction. A vehicle wiring harness is connected to the connector 16a. Signal wires from the sensors 8 are connected to the connector 16b.

Heat radiating portions 36a are formed on the intermediate member 36 by making portions thereof protrude downward. The heat-radiating portions 36a protrude outward from the intermediate member 36 so as to contact or be in close proximity to the CPU 10 and the driving circuit 11 that are mounted onto the upper surface of the circuit board 4, and also to the upper surface of the circuit board 4 at positions at which the switching elements 31 and 32 are mounted. The heat generated in the CPU 10, the driving circuit 11, and the switching elements 31 and 32 is thereby radiated through the heat-radiating portions 36a. Terminals for electrical connection to the switching elements 31 and 32, and terminals for connection to the output wires 28 of the motor winding 24, etc., are also disposed on a right end portion in FIG. 2.

The connectors 16a and 16b are molded integrally with the intermediate member 36, and protrude in a direction that is perpendicular to a vertical direction through the notch 15a in the housing 15, which covers everything. A protruding portion 16e is formed so as to protrude from outer circumferential surfaces of the connectors 16a and 16b so as to contact inner circumferential wall surfaces of the notch 15a. Precisely, the protruding portion 16e is disposed on three surfaces of the connectors 16a and 16b that include an upper surface, a front surface, and a rear surface in FIG. 2.

Posts 38 are also molded integrally with the intermediate member 36 so as to extend directly downward from each of the connectors 16a and 16b. Although not depicted, a plurality of posts 38 are formed integrally with the intermediate member 36 so as to extend directly downward from the intermediate member 36. These posts 38 are fixed to an upper surface of the motor case 25 or the frame 29. The intermediate member 36 thereby has a construction that is fixed to and supported by the motor case 25 or the frame 29. The posts 38 do not contact the circuit board 4. Thus, the configuration is such that when stresses due to inserting and removing the connectors 16a and 16b act downward in FIG. 2, those stresses act negligibly on the circuit board 4, but act on the motor case 25 or the frame 29 through the posts 38. Furthermore, the configuration is such that if those stresses act upward in FIG. 2, or in a front-back direction to the surface of the page, they act on the inner circumferential wall surfaces of the notch 15a in the housing 15 through the protruding portion 16e.

In the above manner, because the configuration is such that the connectors 16a and 16b and the intermediate member 36 are molded integrally, and stresses due to inserting and removing the connectors 16a and 16b do not act on the circuit board 4, but instead act on the housing 15, the motor case 25, and the frame 29, which have strength, strength deficiency is prevented.

Moreover, the output wires 28 of the motor winding 24 and the switching elements 31 and 32 are electrically connected by the extended ends of the output wires 28 by being placed in contact (pressure contact) with terminals 36d that constitute extended portions of the busbars of the intermediate member 36.

According to Embodiment 1, because the control unit 1 is constituted by three primary members, namely, the housing 15, the circuit board 4, and the intermediate member 36 with which the connectors 16a and 16b are integrated, reductions in size and reductions in weight can be achieved, and ease of assembly can also be improved by stacking thereof, enabling ease of assembly of the entire apparatus also to be improved by integration with the motor 2, which is in turn assembled separately. Because the connectors 16a and 16b are configured so as to be integrated with the intermediate member 36 instead of the circuit board 4 such that stresses due to inserting and removing the connectors 16a and 16b do not act on the circuit board 4, the occurrence of electrical connection failure inside the circuit board 4 can be suppressed.

Embodiment 2

Figure 3:
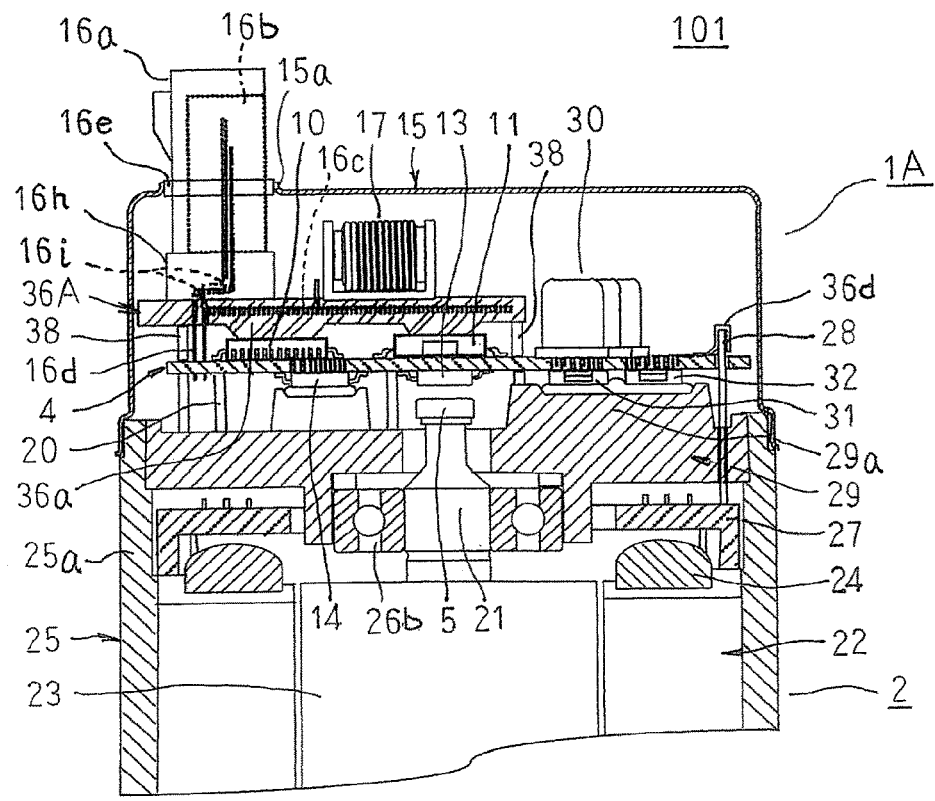
FIG. 3 is a cross section that shows part of an electric power steering apparatus according to Embodiment 2 of the present invention.

FIG. 3 is a cross section that shows part of an electric power steering apparatus according to Embodiment 2 of the present invention. Moreover, in FIG. 3, identical numbering has been applied to portions that are similar or identical to those in Embodiment 1.

In FIG. 3, an electric power steering apparatus 101 includes a control unit 1A and a motor 2, the control unit 1A being configured so as to be disposed at an opposite end from an output end of a rotating shaft 21 of the motor 2 so as to be integrated with the motor 2. The electric power steering apparatus 101 is disposed such that an axial direction of the rotating shaft 21 of the motor 2 is oriented vertically and such that the control unit 1A is positioned above. The control unit 1A includes: a circuit board 4; a housing 15; and an intermediate member 36A in which connectors 16a and 16b are formed integrally.

The connectors 16a and 16b and the intermediate member 36A are each molded as separate parts. Connector pins are insert-molded into the connectors 16a and 16b, and busbars 16c are insert-molded into the intermediate member 36A. The connector pins that are insert-molded into the connectors 16a and 16b extend downward through sockets of the connectors 16a and 16b into and from which male connectors are inserted and removed, reach a connecting portion 16h, that constitutes a root portion, are bent twice perpendicularly at the connecting portion 16h, and extend out downward from the connecting portion 16h. Thus, the connector pins of the connectors 16a and 16b have bend portions 16i at two positions within the connecting portion 16h.

The connector 16a is configured so as to be integrated with the intermediate member 36A by fixing the portions of the connector pins that protrude from the connecting portion 16h to an upper surface at an end portion of the intermediate member 36A by welding or soldering them to the busbars 16c of the intermediate member 36A. The connector 16b is configured so as to be integrated with the intermediate member 36A by fixing some of the portions of the connector pins that protrude from the connecting portion 16h to an upper surface at an end portion of the intermediate member 36A by welding or soldering them to the busbars 16c of the intermediate member 36A.

A CPU 10, a driving circuit 11, and capacitors 30, etc., are mounted onto an upper surface of the circuit board 4. A rotational angle detecting circuit 13, electric power supplying switching elements 14, and switching elements 31 and 32 that constitute part of an inverter circuit 3 are mounted onto a lower surface of the circuit board 4. The circuit board 4 is disposed on an upper portion of the frame 29 by fixing a plurality of leg portions 20 that are disposed so as to stand on a lower surface of the circuit board 4 to an upper surface of the frame 29. The switching elements 14, 31, and 32 that are disposed on the lower surface of the circuit board 4 contact the heat radiating portion 29a directly or so as to have a heat-conducting sheet interposed.

The intermediate member 36A is configured so as to have a smaller area than the circuit board 4, and a coil 17 is mounted to an upper surface thereof. Posts 38 are also formed integrally on the intermediate member 36A so as to extend straight downward from portions of the intermediate member 36A to which the connectors 16a and 16b are mounted. In addition, the plurality of posts 38 are formed integrally with the intermediate member 36A so as to extend directly downward from a plurality of positions on the lower surface of the intermediate member 36A. The intermediate member 36A is disposed on an upper portion of the circuit board 4 by fixing the posts 38 to an upper surface of the frame 29. Portions of the remaining connector pins of the connectors 16b that protrude from the connecting portion 16h pass downward through the intermediate member 36A, and are connected to wiring patterns of the circuit board 4 that are intended for connection therewith.

Heat radiating portions 36a are formed on the intermediate member 36A by making portions thereof protrude downward. The heat-radiating portions 36a contact the CPU 10 and the driving circuit 11 that are mounted onto the upper surface of the circuit board 4 directly or so as to have a heat-conducting sheet interposed. The heat generated in the CPU 10 and the driving circuit 11 is thereby radiated through the heat-radiating portions 36a. The output wires 28 of the motor winding 24 are electrically connected by being placed in contact (pressure contact) with terminals 36d that constitute extended portions of the wiring of the circuit board 4.

The housing 15 is fixed in an externally fitted state by press-fitting or shrink-fitting, etc., a vicinity of an opening over the uppermost portion of the cylindrical portion 25a of the motor case 25, and houses the circuit board 4 and the intermediate member 36A internally. The connectors 16a and 16b protrude upward out of a notch 15a in the housing 15. A protruding portion 16e is formed so as to protrude from outer circumferential surfaces of the connectors 16a and 16b so as to contact inner circumferential wall surfaces of the notch 15a.

In the electric power steering apparatus 101 that is configured in this manner, a direction of insertion and removal of the connectors 16a and 16b is vertical. When stresses due to inserting and removing the connectors 16a and 16b act downward in FIG. 3, the stresses act on the intermediate member 36A and the frame 29 by means of the posts 38, and act negligibly on the circuit board 4. Furthermore, if stresses due to inserting and removing the connectors 16a and 16b act in a direction that is perpendicular to the vertical direction in FIG. 3, then the stresses act on the inner circumferential wall surfaces of the notch 15a by means of the protruding portion 16e. The control unit 1A is configured using three primary members, namely, the housing 15, the circuit board 4, and the intermediate member 36A with which the connectors 16a and 16b are integrated.

Consequently, similar or identical effects to those of Embodiment 1 can also be achieved in Embodiment 2.

According to Embodiment 2, the connector pins of the connectors 16a and 16b have bend portions 16i inside the connecting portion 16h. Thus, expansion and contraction of the connector pins in the longitudinal direction due to temperature changes in the connector pins that accompany electric power supply are absorbed by the bend portions 16i. Stresses that act on the connecting portions between the connector pins and the busbars due to temperature changes are thereby alleviated.

Because the connecting portion 16h is disposed in a vicinity of the roots of the connectors 16a and 16b, protruding dimensions of the connectors 16a and 16b above the upper surface of the housing 15 can be changed by changing the height dimension of the connecting portion 16h.

Because microminiature-type capacitors 30 are used, and are mounted onto the circuit board 4, the capacitors 30 can be disposed in close proximity to the switching elements 31 and 32.

Embodiment 3

Figure 4:
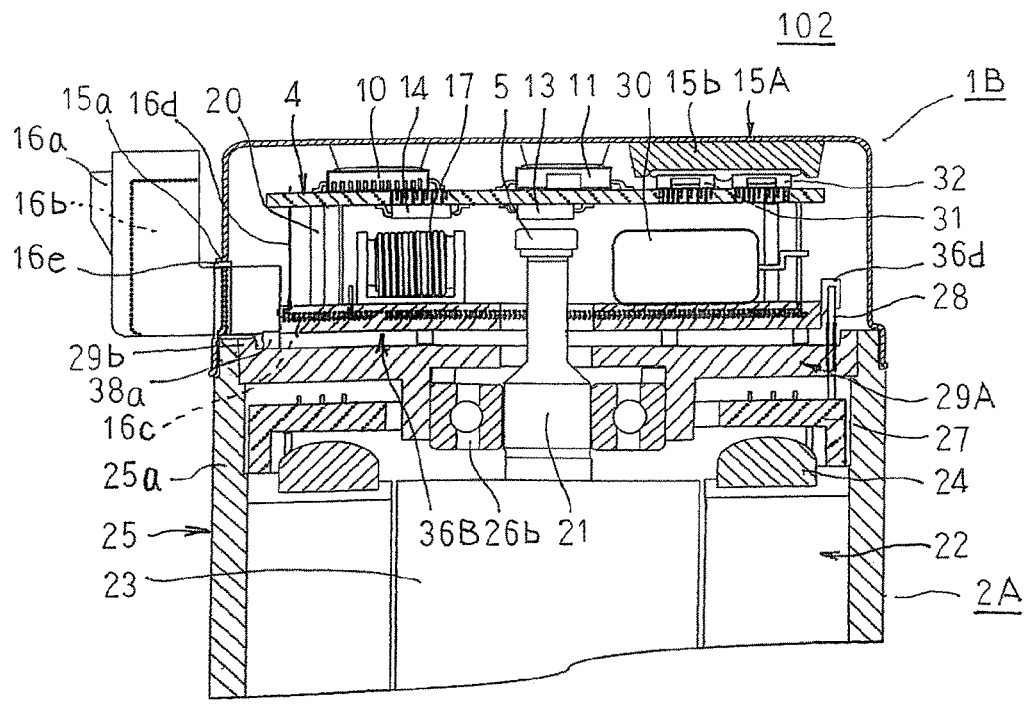
FIG. 4 is a cross section that shows part of an electric power steering apparatus according to Embodiment 3 of the present invention.

FIG. 4 is a cross section that shows part of an electric power steering apparatus according to Embodiment 3 of the present invention. Moreover, in FIG. 4, identical numbering has been applied to portions that are similar or identical to those in Embodiment 1.

In FIG. 4, an electric power steering apparatus 102 includes a control unit 1B and a motor 2A, the control unit 1B being configured so as to be disposed at an opposite end from an output end of a rotating shaft 21 of the motor 2A so as to be integrated with the motor 2A. The electric power steering apparatus 102 is disposed such that an axial direction of the rotating shaft 21 of the motor 2A is oriented vertically and such that the control unit 1B is positioned above.

The motor 2A includes: a motor main body that includes a stator 22 and a rotor 23; a motor case 25; and a frame 29A. The frame 29A is produced so as to have a metal disk shape, includes a stress-bearing portion 29b that has a thick outer circumferential edge portion, and is held on a cylindrical portion 25a of the motor case 25 by press-fitting or shrinkage-fitting. The frame 29A is placed in contact with a step that is formed in a vicinity of an opening of an inner circumferential surface of the cylindrical portion 25a such that movement toward the output end of the rotating shaft 21 is restricted.

The control unit 1B includes: a circuit board 4; a housing 15A; and an intermediate member 36B in which connectors 16a and 16b are formed integrally.

L-shaped connectors 16a and 16b are molded integrally with the intermediate member 36B. The intermediate member 36B is formed so as to have an approximate disk shape except for the perimeters of the connectors 16a and 16b. In addition, busbars 16c and 16d are insert-molded into the intermediate member 36B.

A coil 17 is mounted onto an upper surface of the intermediate member 36B, and is connected to a +B terminal of the busbar 16c, and to electric power supplying switching elements 14 by means of busbars (not shown). Capacitors 30 are mounted onto an upper surface of the intermediate member 36B, and are connected to the electric power supplying switching elements 14 by means of busbars (not shown), and to a ground terminal of the busbar 16c. A plurality of posts 38a are formed integrally with the intermediate member 36B so as to extend directly downward from the intermediate member 36B.

The intermediate member 36B that is configured in this manner is disposed on an upper portion of the frame 29A by fixing the posts 38a to an upper surface on an inner circumferential side of the stress-bearing portion 29b of the frame 29A such that lower surfaces of the L-shaped root portions of the connectors 16a and 16b contact the upper surface of the stress-bearing portion 29b of the frame 29A.

A CPU 10, a driving circuit 11, and switching elements 31 and 32 are mounted onto an upper surface of the circuit board 4. A rotational angle detecting circuit 13 and electric power supplying switching elements 14 are mounted onto a lower surface of the circuit board 4. The circuit board 4 is disposed on an upper portion of the intermediate member 36B by fixing a plurality of leg portions 20 that are disposed so as to stand on a lower surface of the circuit board 4 to an upper surface of the intermediate member 36B.

The housing 15A is made of a metal, and heat-radiating portions 15b are formed so as to protrude from an inner wall surface on the bottom portion of the housing 15A so as to face the CPU 10, the driving circuit 11, and the switching elements 31 and 32. The housing 15A is fixed in an externally fitted state by press-fitting or shrink-fitting, etc., a vicinity of an opening over the uppermost portion of the cylindrical portion 25a of the motor case 25, and houses the circuit board 4 and the intermediate member 36B internally. The connectors 16a and 16b protrude in a direction that is perpendicular to a vertical direction out of a notch 15a in the housing 15A. A protruding portion 16e is formed so as to protrude from outer circumferential surfaces of the connectors 16a and 16b so as to contact inner circumferential wall surfaces of the notch 15a.

The heat-radiating portions 15b contact the CPU 10, the driving circuit 11, and the switching elements 31 and 32 directly or so as to have thermally conductive sheets that have elasticity interposed. The busbars 16d enter the intermediate member 36B from the connector 16b, then extend directly upward to be connected to wiring patterns of the circuit board 4 that are intended for connection therewith. The rotating shaft 21 passes through the frame 29 and the intermediate member 36B, and extends to a vicinity of the rotational angle detecting circuit 13. A rotation sensor rotor 5 is disposed on a tip of the rotating shaft 21 so as to face the rotational angle detecting circuit 13.

In the electric power steering apparatus 102 that is configured in this manner, a direction of insertion and removal of the connectors 16a and 16b is vertical. When stresses due to inserting and removing the connectors 16a and 16b act downward in FIG. 4, the stresses act on the stress-bearing portion 29b of the frame 29A, and act negligibly on the circuit board 4. Furthermore, if stresses due to inserting and removing the connectors 16a and 16b act upward and in a direction that is perpendicular to the vertical direction in FIG. 4, then the stresses act on the inner circumferential wall surfaces of the notch 15a in the housing 15A by means of the protruding portion 16e. The control unit 1B is configured using three primary members, namely, the housing 15A, the circuit board 4, and the intermediate member 36B with which the connectors 16a and 16b are integrated.

Consequently, similar or identical effects to those of Embodiment 1 can also be achieved in Embodiment 3.

According to Embodiment 3, a circuit board 4 onto which a CPU 10, a driving circuit 11, and switching elements 31 and 32 are mounted is disposed on an opposite side of an intermediate member 36B from a frame 29A. Thus, because the circuit board 4 can be disposed away from a motor 2A, the influence of noise on the circuit board 4 during driving of the motor 2A is reduced. Furthermore, heat-radiating portions 29a are no longer required, enabling reductions in the thickness of the frame 29A. Thus, if a pressure-bearing portion 29b is formed by increasing thickness only on an outer circumferential edge portion of the frame 29A, a region on an inner circumferential side of the pressure-bearing portion 29b of the frame 29A where the intermediate member 36B and the circuit board 4 are stacked can be made thinner. Axial dimensions of the electric power steering apparatus 103 can thereby be reduced.

Because the heat generated in the CPU 10, the driving circuit 11, and the switching elements 31 and 32 is radiated from the broad surface of the housing 15A through the heat-radiating portions 15b, heat-radiating characteristics of the CPU 10, the driving circuit 11, and the switching elements 31 and 32 are improved.

Moreover, in Embodiment 3 above, the configuration is such that downward stresses due to inserting and removing the connectors 16a and 16b are borne by the stress-bearing portion 29b of the frame 29A, but the configuration may be such that downward stresses due to inserting and removing the connectors 16a and 16b are borne by the cylindrical portion 25a of the motor case 25.

Embodiment 4

Figure 5:
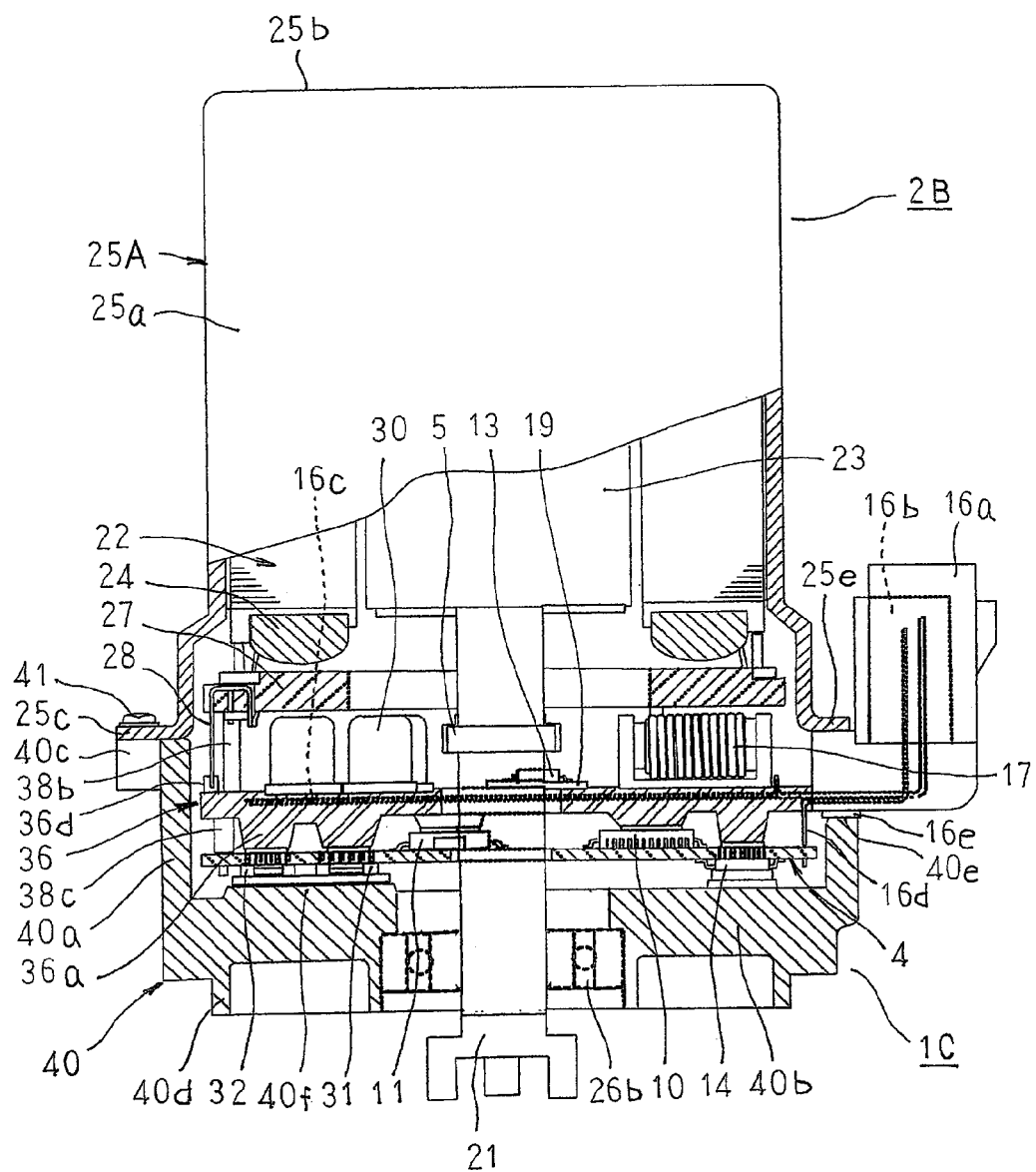
FIG. 5 is a partially cutaway side elevation that shows an electric power steering apparatus according to Embodiment 4 of the present invention.

FIG. 5 is a partially cutaway side elevation that shows an electric power steering apparatus according to Embodiment 4 of the present invention. Moreover, in FIG. 5, identical numbering has been applied to portions that are similar or identical to those in Embodiment 1.

In FIG. 5, an electric power steering apparatus 103 includes a control unit 1C and a motor 2B, the control unit 1C being configured so as to be disposed at an output end of a rotating shaft 21 of the motor 2B so as to be integrated with the motor 2B. The electric power steering apparatus 103 is disposed such that an axial direction of the rotating shaft 21 of the motor 2B is oriented vertically and such that the control unit 1C is positioned below.

The motor 2B is configured such that a motor main body is mounted internally into a floored cylindrical motor case 25A that includes a cylindrical portion 25a and a floor portion 25b, and is disposed such that an opening of the motor case 25A faces downward. This motor case 25A is made of a metal, and a first bearing (not shown) is mounted centrally on an inner wall surface of the floor portion 25b. A mounting flange 25c is also formed integrally so as to protrude radially outward from an opening end of the cylindrical portion 25a.

The motor main body includes: a rotor 23 that is disposed inside the motor case 25A such that a rotating shaft 21 is rotatably supported by the first bearing and a second bearing 26b; and a stator 22 that is disposed circumferentially outside this rotor 23 coaxially so as to have a gap interposed, the stator 22 having a motor winding 24. An annular connecting ring 27 is produced by insert-molding electrical wiring busbars into an insulating resin, and is disposed on a lower portion of the stator 22 so as to be in close proximity to the motor winding 24. A rotation sensor rotor 5 is mounted so as to be fitted over a portion of the rotating shaft 21 that protrudes downward from the connecting ring 27.

The control unit 1C includes: a circuit board 4; a housing 40; and an intermediate member 36 in which connectors 16a and 16b are formed integrally.

L-shaped connectors 16a and 16b are molded integrally with the intermediate member 36. The intermediate member 36 is formed so as to have an approximate disk shape except for the perimeters of the connectors 16a and 16b. Busbars 16c and 16d are insert-molded into the intermediate member 36. A plurality of heat-radiating portions 36a are formed on a lower surface of the intermediate member 36.

A coil 17 is mounted onto an upper surface of the intermediate member 36 such that a major axis is oriented in a direction that is perpendicular to a vertical direction, and is connected to a +B terminal of the busbar 16c, and to electric power supplying switching elements 14 by means of busbars (not shown). Microminiature-type capacitors are used as capacitors 30, and are mounted onto an upper surface of the intermediate member 36 so as to be juxtaposed in a direction that is perpendicular to a vertical direction, and are each connected to the electric power supplying switching elements 14 by means of busbars (not shown), and to a ground terminal of the busbar 16c. A plurality of posts 38b and 38c are formed integrally with the intermediate member 36 so as to extend directly upward and directly downward from the intermediate member 36. In addition, a plurality of heat-radiating portions 36a are formed so as to protrude from a lower surface of the intermediate member 36.

A CPU 10, a driving circuit 11, electric power supplying switching elements 14, and switching elements 31 and 32 that constitute part of an inverter circuit 3 are disposed so as to be distributed on two surfaces of the circuit board 4.

The intermediate member 36 is disposed on a lower portion of the motor 2B so as to be supported on the connecting ring 27 by means of the posts 38b. In addition, the circuit board 4 is disposed on a lower portion of the intermediate member 36 so as to be supported on the intermediate member 36 by means of the posts 38c. Here, the heat-radiating portions 36a each contact the CPU 10 and the driving circuit 11 that are mounted onto the upper surface of the circuit board 4, and also the upper surface of the circuit board 4 at positions at which the switching elements 14, 31, and 32 are mounted, contacting directly or so as to have thermally conductive sheets that have elasticity interposed.

The housing 40 is made of a metal that is produced so as to have a floored cylindrical shape that includes a cylindrical portion 40a and a floor portion 40b, and when consideration is given to heat-radiating characteristics, workability, and interfittability, it is desirable for the housing 40 to be produced using aluminum. A penetrating aperture that allows passage of the rotating shaft 21 is formed centrally on the floor portion 40b of the housing 40, and the second bearing 26b is mounted into that penetrating aperture. A mounting flange 40c is also formed integrally so as to protrude radially outward from the opening end of the cylindrical portion 25a. A connecting portion 40d that connects with a reduction gear (not shown) is formed integrally so as to protrude downward from the floor portion 40b. A notch 40e that allows the connectors 16a and 16b to protrude is formed in a vicinity of the opening end of the cylindrical portion 40a. A plurality of heat-radiating portions 40f are formed so as to project from an inner wall surface of the floor portion 40b.

The housing 40 is mounted to the motor case 25A by butting the opening end of the cylindrical portion 40a to the opening end of the cylindrical portion 25a of the motor case 25A, and fixing the mounting flanges 25c and 40c by fastening using screws 41. Here, the rotating shaft 21 passes through the connecting ring 27, the intermediate member 36, the circuit board 4, and the floor portion 40b of the housing 40, and protrudes externally. A vicinity of a lower end of the rotating shaft 21 is supported by the second bearing 26b. A rotational angle detecting circuit 13 is mounted to the intermediate member 36 so as to have a small circuit board 19 interposed in close proximity to the rotation sensor rotor 5. Vicinities of upper portions of root portions of the L-shaped connectors 16a and 16b are placed in contact with bend portions 25e that are bent perpendicularly radially outward through the opening end of the cylindrical portion 25a of the motor case 25A. The heat-radiating portions 40f contact the switching elements 31 and 32 directly or so as to have thermally conductive sheets that have elasticity interposed. A protruding portion 16e is formed so as to protrude from outer circumferential surfaces of the connectors 16a and 16b so as to contact inner circumferential wall surfaces of the notch 40e.

In the electric power steering apparatus 103 that is configured in this manner, a direction of insertion and removal of the connectors 16a and 16b is vertical. When stresses due to inserting and removing the connectors 16a and 16b act upward in FIG. 5, the stresses act on the cylindrical portion 25a through the bend portions 25e, and act negligibly on the circuit board 4. Furthermore, if stresses due to inserting and removing the connectors 16a and 16b act downward and in a direction that is perpendicular to the page surface in FIG. 5, then the stresses act on the inner circumferential wall surfaces of the notch 40e in the housing 40 by means of the protruding portion 16e. The control unit 1C is configured using three primary members, namely, the housing 40, the circuit board 4, and the intermediate member 36 with which the connectors 16a and 16b are integrated.

Consequently, similar or identical effects to those of Embodiment 1 can also be achieved in Embodiment 4.

According to Embodiment 4, the heat-radiating portions 36a that are formed on the intermediate member 36 each contact the CPU 10 and the driving circuit 11 that are mounted onto the upper surface of the circuit board 4, and also the upper surface of the circuit board 4 at positions at which the switching elements 14, 31, and 32 are mounted. In addition, the heat-radiating portions 40f that are formed on the inner wall surface of the floor portion 40b of the housing 40 contact the switching elements 14, 31, and 32. Heat-radiating characteristics of the CPU 10, the driving circuit 11, and the switching elements 14, 31, and 32 are thereby improved.

Because the microminiature capacitors 30 are disposed so as to be juxtaposed in a direction that is perpendicular to a vertical direction, and the coil 17 is mounted onto the intermediate member 36 so as to have a major axis in a direction that is perpendicular to the vertical direction, axial heights of the coil 17 and the capacitors 30 are reduced, enabling the axial dimensions of the electric power steering apparatus 103 to be reduced.

The housing 40 covers the intermediate member 36 and the circuit board 4, and is mounted to the motor case 25A so as to cover the opening of the motor case 25A, serving the function of a frame. Thus, because the frame can be omitted, the number of parts is reduced, enabling ease of assembly of the electric power steering apparatus 103 to be improved.

Moreover, in Embodiment 4 above, the heat-radiating portions 36a that are formed on the intermediate member 36 are configured so as to contact the CPU 10 and the driving circuit 11 directly or so as to have thermally conductive sheets that have elasticity interposed, but if a surface material of the CPU 10 and the driving circuit 11 is an electrically insulating member, metal members may be fitted into the heat-radiating portions 36a, and the heat-radiating portions 36a placed in contact with the CPU 10 and the driving circuit 11 so as to have the metal sheets in question interposed. In that case, the heat generated in the CPU 10 and the driving circuit 11 will be conducted efficiently by the heat-radiating portions 36a.

In each of the above embodiments, busbars are insert-molded into intermediate members, but busbars may be outsert-molded to the intermediate member.

The invention claimed is:

1. An electric power steering apparatus in which a motor and a control unit are integrated so as to be juxtaposed in an axial direction of a rotating shaft of said motor, wherein:
   said motor comprises:
   a motor case that comprises:
   a cylindrical portion; and
   a floor portion that closes an opening at a first end of said cylindrical portion;
   a motor main body that is housed inside said motor case; and
   a frame that closes an opening at a second end of said motor case;
   said control unit comprises:
   a circuit board on which circuits for controlling driving of said motor are configured;

a connector;

an intermediate member that holds busbars for electrical wiring; and a housing that houses said circuit board and said intermediate member internally;

said circuit board and said intermediate member are disposed so as to be juxtaposed in said axial direction of said rotating shaft;

said connector is formed integrally on said intermediate member, and is disposed so as to pass through and protrude from a notch in said housing; and at least one of said cylindrical portion, said frame, and said housing is configured so as to bear stress in said axial direction of said rotating shaft, that acts on said connector during insertion and removal of said connector.

2. The electric power steering apparatus according to claim 1, wherein a protruding portion is formed on an outer circumferential surface of said connector so as to contact an inner circumferential wall surface of said notch.

3. The electric power steering apparatus according to claim 1, wherein switching elements that drive said motor are mounted onto said circuit board, said switching elements contacting said frame or said housing.

4. The electric power steering apparatus according to claim 3, wherein said control unit is disposed at an opposite end of said motor from an output end of said rotating shaft, and is arranged in order of said circuit board and said intermediate member from a vicinity of said motor.

5. The electric power steering apparatus according to claim 4, wherein:

said motor case is disposed such that said bottom portion is oriented toward an output end of said rotating shaft;

a heat-radiating portion is formed by making a surface of said frame that closes said opening at said second end of said motor case protrude outward on an opposite side from said output end of said rotating shaft; and said switching elements are mounted to a surface of said circuit board on a side near said motor so as to contact said heat-radiating portion.

6. The electric power steering apparatus according to claim 3, wherein said control unit is disposed at an opposite end of said motor from an output end of said rotating shaft, and is arranged in order of said intermediate member and said circuit board from a vicinity of said motor.

7. The electric power steering apparatus according to claim 6, wherein:

said housing is mounted to said motor case so as to cover said intermediate member and said circuit board;

a heat-radiating portion is formed by making a surface of said housing that faces said rotating circuit board protrude outward; and said switching elements are mounted to a surface of said circuit board on an opposite side from said motor so as to contact said heat-radiating portion.

8. The electric power steering apparatus according to claim 3, wherein said control unit is disposed on said motor near an output end of said rotating shaft, and is arranged in order of said intermediate member and said circuit board from a vicinity of said motor.

9. The electric power steering apparatus according to claim 8, wherein:

said motor case is disposed such that said bottom portion is oriented away from an output end of said rotating shaft;

said housing and said frame are formed so as to be integrated and are mounted to said motor case so as to cover said intermediate member and said circuit board so as to close said opening at said second end of said motor case;

a heat-radiating portion is formed by making a surface of said housing that faces said circuit board protrude outward; and said switching elements are mounted to a surface of said circuit board on an opposite side from said motor so as to contact said heat-radiating portion.

10. The electric power steering apparatus according to claim 1, wherein a thickness of a portion of said intermediate member where said connector passes through said notch is thicker than other portions of said intermediate member.

* * * * *